US012579927B2

(12) United States Patent
Jang

(10) Patent No.: US 12,579,927 B2
(45) Date of Patent: Mar. 17, 2026

(54) METHOD OF ALIGNING LIGHT EMITTING ELEMENT AND METHOD OF FABRICATING DISPLAY DEVICE

(71) Applicant: Samsung Display Co., LTD., Yongin-si (KR)

(72) Inventor: Joo Nyung Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/474,312

(22) Filed: Sep. 26, 2023

(65) Prior Publication Data

US 2024/0331614 A1 Oct. 3, 2024

(30) Foreign Application Priority Data

Mar. 28, 2023 (KR) ........................ 10-2023-0040795

(51) Int. Cl.
*G09G 3/30* (2006.01)
*G09G 3/32* (2016.01)

(52) U.S. Cl.
CPC ....... *G09G 3/32* (2013.01); *G09G 2300/0426* (2013.01); *G09G 2310/06* (2013.01); *G09G 2330/028* (2013.01)

(58) Field of Classification Search
CPC ............. G09G 3/32; G09G 2300/0426; G09G 2310/06; G09G 2330/028; G09G 3/30; G09G 3/3208; G09G 3/3241; G09G 3/348; G09G 3/344
See application file for complete search history.

(56) References Cited

U.S. PATENT DOCUMENTS

2011/0058126 A1* 3/2011 Okada .................... H10K 19/10 257/E29.112
2019/0086363 A1* 3/2019 Covey .................. H01J 49/067
2021/0273131 A1 9/2021 Kang et al.
2021/0389228 A1* 12/2021 Seo ................... G01N 15/0612

FOREIGN PATENT DOCUMENTS

KR 10-2020-0034898 4/2020
KR 10-2022-0090092 6/2022

OTHER PUBLICATIONS

Pohl et al., "Dielectrophoretic Force: A Comparison of Theory and Experiment", Journal of Biological Physics, Sep. 1978, pp. 133-160, vol. 6.

(Continued)

*Primary Examiner* — Dennis P Joseph
(74) *Attorney, Agent, or Firm* — Womble Bond Dickinson (US) LLP

(57) ABSTRACT

A method of aligning a light emitting element includes providing ink including light emitting elements on a substrate, a first electrode and a second electrode spaced apart from the first electrode being disposed on the substrate, applying a first alternating current (AC) voltage having a first frequency to the first electrode and the second electrode, and applying a second AC voltage having a second frequency different from the first frequency to the first electrode and the second electrode after applying the first AC voltage.

16 Claims, 14 Drawing Sheets

(56) References Cited

OTHER PUBLICATIONS

Eo et al., “Enhanced DC-Operated Electroluminescence of Forwardly Aligned p/MQW/n InGaN Nanorod LEDs via DC Offset-AC Dielectrophoresis”, ACS Appl. Mater. Interfaces, Oct. 11, 2017, pp. 37912-37920, vol. 9.

Crane et al., “Theoretical Models of Cellular Dielectrophoresis”, Journal of Theoretical Biology, Oct. 1972, pp. 15-41, vol. 37, Issue 1.

Pohl, “Some Effects of Nonuniform Fields on Dielectrics”, Journal of Applied Physics, Aug. 1958, pp. 1182-1188, vol. 29, No. 8.

Pohl, “The Motion and Precipitation of Suspensoids in Divergent Electric Fields”, Journal of Applied Physics, Jul. 1951, pp. 869-871, vol. 22, No. 7.

Sarno et al., “Dielectrophoresis: Developments and applications from 2010 to 2020”, Electrophoresis, Nov. 16, 2020, pp. 539-564, vol. 42, Issue 5.

* cited by examiner

METHOD OF ALIGNING LIGHT EMITTING ELEMENT AND METHOD OF FABRICATING DISPLAY DEVICE

CROSS-REFERENCE TO RELATED APPLICATION(S)

This application claims priority to and benefits of Korean patent application No. 10-2023-0040795 under 35 U.S.C. § 119 filed on Mar. 28, 2023, in the Korean Intellectual Property Office, the entire contents of which are incorporated herein by reference.

BACKGROUND

1. Technical Field

Various embodiments are directed to a method of fabricating a display device and, more, to a method of aligning a light emitting element on an electrode formed on a substrate.

2. Description of the Related Art

With the development of information technology, the importance of a display device that is a connection medium between a user and information has been emphasized. Owing to the importance of display devices, the use of various kinds of display devices, such as a liquid crystal display device and an organic light-emitting display device, has increased.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Various embodiments are directed to a method of fabricating a display device, capable of improving the biasing ratio of light emitting elements in case that the light emitting elements are aligned on an alignment electrode formed on a substrate.

The disclosure is not limited to the above-described objects, and other objects will be clearly understood by those skilled in the art from the following description.

An embodiment may include a method of aligning a light emitting element, that may include providing ink including a plurality of light emitting elements on a substrate, a first electrode and a second electrode spaced apart from the first electrode being disposed on the substrate; applying a first alternating current (AC) voltage having a first frequency to the first electrode and the second electrode; and applying a second AC voltage having a second frequency different from the first frequency to the first electrode and the second electrode after the applying of the first AC voltage.

In an embodiment, each of the plurality of light emitting elements may include a first conductive semiconductor and a second conductive semiconductor. The applying of the second AC voltage may be performed after the plurality of light emitting elements are biased and aligned by the first AC voltage such that the first conductive semiconductor of each of the plurality of light emitting elements is oriented toward the first electrode, and the second conductive semiconductor of each of the plurality of light emitting elements is oriented toward the second electrode.

In an embodiment, the applying of the second AC voltage may be performed before the plurality of light emitting elements are disposed on the first electrode and the second electrode.

In an embodiment, the second frequency of the second AC voltage may be greater than the first frequency of the first AC voltage.

In an embodiment, the first frequency may be a frequency in case that a real part of a Clausius-Mossotti (CM) factor is less than 0, and the CM factor is defined as $$f_{CM} = \frac{\varepsilon_p^* - \varepsilon_m^*}{\varepsilon_p^* + 2\varepsilon_m^*},$$

where $\varepsilon^*_p$ denotes a complex dielectric constant of any one of the plurality of light emitting elements, and $\varepsilon^*_m$ denotes a complex dielectric constant of a solvent included in the ink.

In an embodiment, the second frequency may be a frequency in case that a real part of a Clausius-Mossotti (CM) factor is greater than 0, and the CM factor is defined as $$f_{CM} = \frac{\varepsilon_p^* - \varepsilon_m^*}{\varepsilon_p^* + 2\varepsilon_m^*},$$

where $\varepsilon^*_p$ denotes a complex dielectric constant of any one of the plurality of light emitting elements, and $\varepsilon^*_m$ denotes a complex dielectric constant of a solvent included in the ink.

In an embodiment, each of the first AC voltage and the second AC voltage may have an asymmetrical waveform.

In an embodiment, a waveform of each of the first AC voltage and the second AC voltage may include at least one of a square waveform, a sine waveform, a triangular waveform, and a sawtooth waveform.

In an embodiment, the first AC voltage may be a voltage obtained by adding a direct current (DC) offset voltage to a third AC voltage having the first frequency of the first AC voltage.

An embodiment may provide a method of fabricating a display device, that may include disposing a first electrode and a second electrode spaced apart from the first electrode on a substrate; providing ink including a plurality of light emitting elements on the substrate; and aligning the plurality of light emitting elements on the first electrode and the second electrode. The aligning of the plurality of light emitting elements on the first electrode and the second electrode may include applying a first alternating current (AC) voltage having a first frequency to the first electrode and the second electrode; and applying a second AC voltage having a second frequency different from the first frequency to the first electrode and the second electrode after applying the first AC voltage.

In an embodiment, each of the plurality of light emitting elements may include a first conductive semiconductor and a second conductive semiconductor. The applying of the second AC voltage may be performed after the plurality of light emitting elements are biased and aligned by the first AC voltage such that the first conductive semiconductor of each of the plurality of light emitting elements is oriented toward the first electrode and the second conductive semiconductor of each of the plurality of light emitting elements is oriented toward the second electrode.

In an embodiment, the applying of the second AC voltage may be performed before the plurality of light emitting elements are disposed on the first electrode and the second electrode.

In an embodiment, the second frequency of the second AC voltage may be greater than the first frequency of the first AC voltage.

In an embodiment, the first frequency may be a frequency in case that a real part of a Clausius-Mossotti (CM) factor is less than 0, and the CM factor is defined as $$f_{CM} = \frac{\varepsilon_p^* - \varepsilon_m^*}{\varepsilon_p^* + 2\varepsilon_m^*},$$

where $\varepsilon^*_p$ denotes a complex dielectric constant of any one of the plurality of light emitting elements, and $\varepsilon^*_m$ denotes a complex dielectric constant of a solvent included in the ink.

In an embodiment, the second frequency may be a frequency in case that a real part of a Clausius-Mossotti (CM) factor is greater than 0, and the CM factor is defined as $$f_{CM} = \frac{\varepsilon_p^* - \varepsilon_m^*}{\varepsilon_p^* + 2\varepsilon_m^*},$$

where denotes a complex dielectric constant of any one of the plurality of light emitting elements, and $\varepsilon^*_m$ denotes a complex dielectric constant of a solvent included in the ink.

In an embodiment, each of the first AC voltage and the second AC voltage may have an asymmetrical waveform.

In an embodiment, a waveform of each of the first AC voltage and the second AC voltage may include at least one of a square waveform, a sine waveform, a triangular waveform, and a sawtooth waveform.

In an embodiment, the first AC voltage may be a voltage obtained by adding a direct current (DC) offset voltage to a third AC voltage having the first frequency of the first AC voltage.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
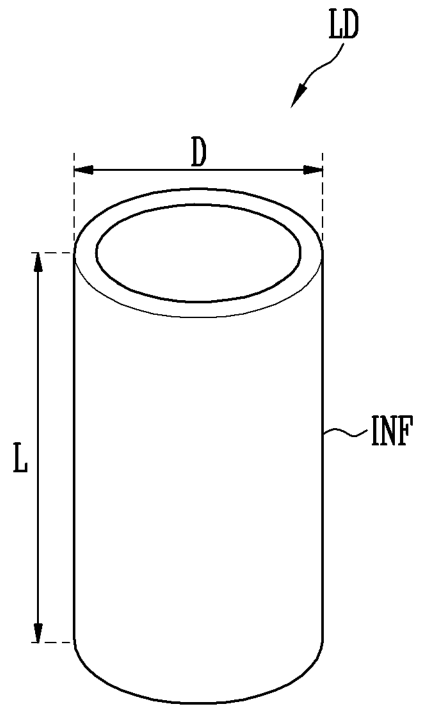
FIGS. 1 and 2 are a schematic perspective view and a schematic sectional view illustrating a light emitting element in accordance with an embodiment.

Reference will now be made in detail to various embodiments, examples of which are illustrated in the accompanying drawings and described below, since embodiments can be variously modified in many different forms. However, this is not intended to limit the disclosure to particular modes of practice, and it is to be appreciated that all changes, equivalents, and substitutes within the spirit and technical scope of the disclosure are encompassed in the disclosure.

Throughout the disclosure, like reference numerals refer to like parts throughout the various figures and embodiments. The sizes of elements in the accompanying drawings may be exaggerated for clarity of illustration.

It will be understood that, although the terms "first", "second", etc. may be used herein to describe various elements, these elements should not be limited by these terms. The aforementioned terms are only used to distinguish one element from another element. For instance, a first element discussed below could be termed a second element without departing from the scope of the disclosure. Similarly, the second element could also be termed the first element.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Furthermore, in case that a first part such as a layer, a film, a region, or a plate is disposed on a second part, the first part may be not only directly on the second part but a third part or other parts may intervene between them. In case that it is expressed that a first part such as a layer, a film, a region, or a plate is formed on a second part, the surface of the second part on which the first part is formed is not limited to an upper surface of the second part but may include other surfaces such as a side surface or a lower surface of the second part. To the contrary, in case that a first part such as a layer, a film, a region, or a plate is under a second part, the first part may be not only directly under the second part but a third part may intervene between them.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be understood that when an element (for example, a first element) is referred to as being (operatively or communicatively) "coupled with/to," or "connected with/to" another element (for example, a second element), the first element can be coupled or connected with/to the second element directly or via another element (for example, a third element). In contrast, it will be understood that when an element (for example, a first element) is referred to as being "directly coupled with/to" or "directly connected with/to" another element (for example, a second element), no other element (for example, a third element) intervenes between the element and the other element.

It will be understood that the terms "connected to" or "coupled to" may include a physical or electrical connection or coupling.

Embodiments and required details are described with reference to the accompanying drawings in order to describe the disclosure in detail so that those having ordinary skill in the art to which the disclosure pertains can readily practice the disclosure.

Furthermore, as used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%. 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
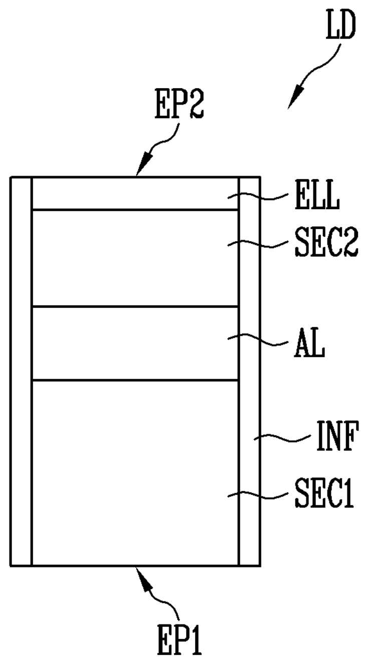

FIGS. 1 and 2 illustrate a light emitting element LD included in a display device in accordance with an embodiment. FIGS. 1 and 2 are a perspective view and a sectional view illustrating a light emitting element LD in accordance with an embodiment.

Referring to FIGS. 1 and 2, the light emitting element LD may include a first semiconductor layer SEC1, a second semiconductor layer SEC2, and an active layer AL interposed between the first semiconductor layer SEC1 and the second semiconductor layer SEC2. The light emitting element LD may further include an electrode layer ELL. In an embodiment, the first semiconductor layer SEC1, the active layer AL, the second semiconductor layer SEC2, and the electrode layer ELL may be successively stacked each other in a longitudinal direction (L) of the light emitting element LD.

The light emitting element LD may include a first end EP1 and a second end EP2. The first semiconductor layer SEC1 may be adjacent to the first end EP1 of the light emitting element LD. The second semiconductor layer SEC2 and the electrode layer ELL may be adjacent to the second end EP2 of the light emitting element LD.

In an embodiment, the light emitting element LD may have a pillar shape. The pillar shape may refer to a shape, such as a cylindrical shape or a prismatic shape, which extends in the longitudinal direction (L). In other words, the length L of the light emitting element LD may be greater than a diameter D thereof (or a width of the cross-section thereof). The shape of the cross-section of the light emitting element LD may include a rod-like shape and a bar-like shape, but the disclosure is not limited thereto.

The light emitting element LD may have a size corresponding to a range from the nanometer scale to the micrometer scale. For example, the diameter D (or the width) and the length L of the light emitting element LD each may have a size ranging from the nanometer scale to the micrometer scale, but the disclosure is not limited thereto.

The first semiconductor layer SEC1 may be a first conductive semiconductor layer. For example, the first semiconductor layer SEC1 may include an N-type semiconductor layer. For instance, the first semiconductor layer SEC1 may include an N-type semiconductor layer which may include any one semiconductor material of InAlGaN, GaN, AlGaN, InGaN, AlN, and InN and is doped with a first conductive dopant such as Si, Ge, or Sn. However, the constituent material of the first semiconductor layer SEC1 is not limited thereto, and the first semiconductor layer SEC1 may be formed of various other materials.

The active layer AL may be disposed on the first semiconductor layer SEC1. The active layer AL may be disposed between the first semiconductor layer SEC1 and the second semiconductor layer SEC2.

The active layer AL may include any one of AlGaInP, AlGaP, AlInGaN, InGaN, and AlGaN. For example, to enable the active layer AL to output red light, the active layer AL may include AlGaInP and/or InGaN. To enable the active layer AL to emit green light or blue light, the active layer AL may include InGaN. However, the disclosure is not limited to the foregoing example.

The active layer AL may have a single-quantum well structure or a multi-quantum well structure.

The second semiconductor layer SEC2 may be disposed on the active layer AL and include a semiconductor layer having a type different from that of the first semiconductor layer SEC1. For example, the second semiconductor layer SEC2 may include a P-type semiconductor layer. For instance, the second semiconductor layer SEC2 may include a P-type semiconductor layer which may include any one semiconductor material of InAlGaN, GaN, AlGaN, InGaN, AlN, and InN, and is doped with a second conductive dopant such as Mg. However, the material for forming the second semiconductor layer SEC2 is not limited thereto, and the second semiconductor layer SEC2 may be formed of various other materials.

The electrode layer ELL may be formed on the second semiconductor layer SEC2. The electrode layer ELL may include metal or metal oxide. In accordance with an embodiment, the electrode layer ELL may include at least any one of Cr. Ti, Al, Au, Ni, ITO, IZO, ITZO, and an oxide or alloy thereof.

If a voltage equal to or greater than a threshold voltage is applied between the opposite ends of the light emitting element LD, the light emitting element LD may emit light by coupling of electron-hole pairs in the active layer AL. Since light emission of the light emitting element LD can be controlled based on the foregoing principle, the light emitting element LD may be used as a light source of various light emitting devices as well as a pixel of the display device (refer to 'DD' of FIG. 3).

The light emitting element LD may further include an insulating film INF provided on a surface of the light emitting element LD. The insulating film INF may be formed of a single layer or a plurality of layers.

The insulating film INF may allow the opposite ends of the light emitting element LD that have different polarities to be exposed to the outside. For example, the insulating film INF may allow a portion of the first semiconductor layer SEC1 disposed adjacent to the first end EP1 and a portion of the electrode layer ELL disposed adjacent to the second end EP2 to be exposed to the outside.

The insulating film INF may include at least one insulating material among silicon oxide ($SiO_x$), silicon nitride ($SiN_x$), silicon oxynitride ($SiO_xN_y$), aluminum oxide ($AlO_x$), and titanium dioxide ($TiO_x$). The disclosure is not limited to a specific example.

The insulating film INF may secure electrical stability of the light emitting element LD. Even in case that a plurality of light emitting elements LD are disposed adjacent to each other, an undesired short-circuit may be prevented from occurring between the light emitting elements LD.

In an embodiment, the light emitting element LD may further include additional other components as well as the first semiconductor layer SEC1, the active layer AL, the second semiconductor layer SEC2, the electrode layer ELL, and the insulating film INF. For example, the light emitting element LD may further include a fluorescent layer, an active layer, a semiconductor layer, and/or an electrode layer.

Figure 3:
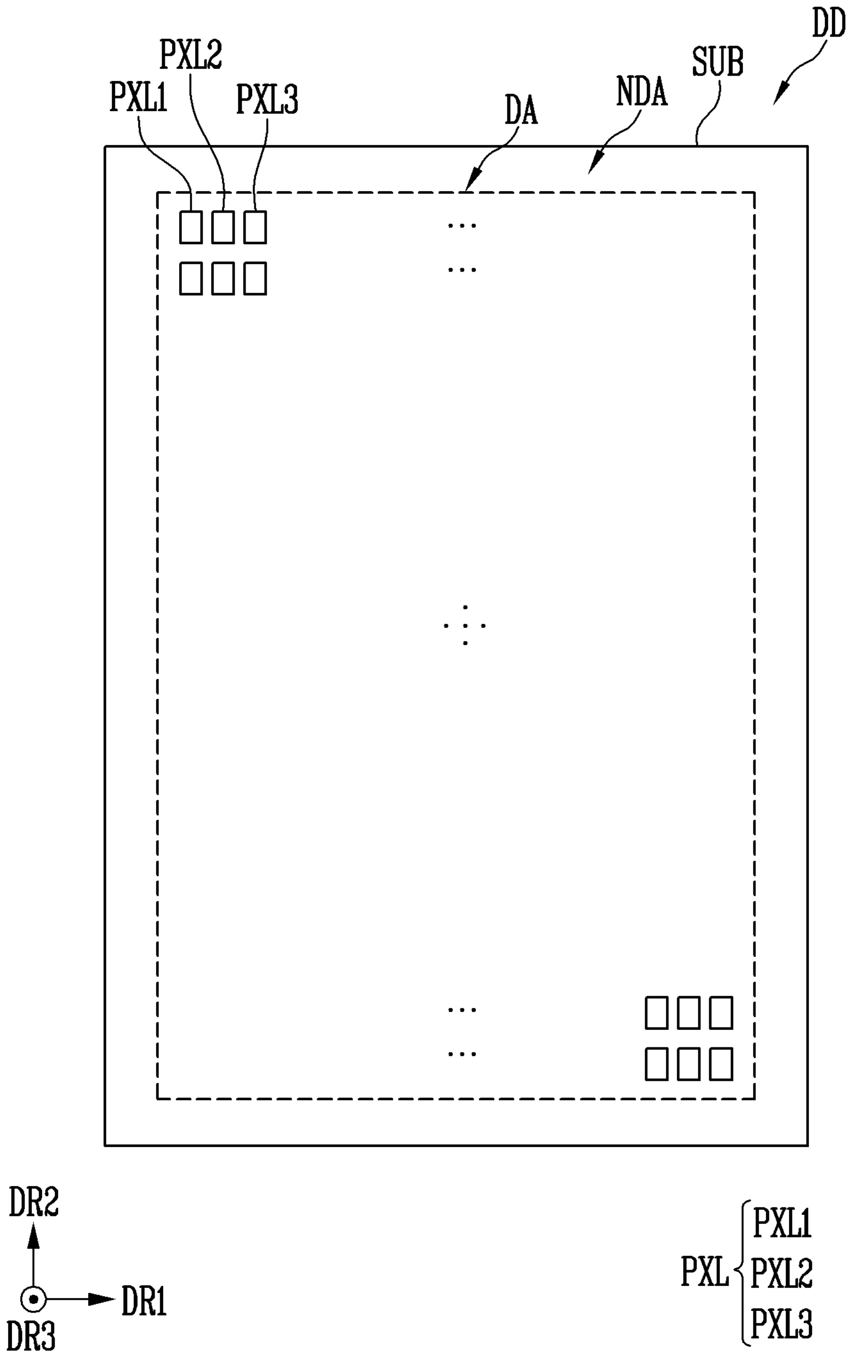
FIG. 3 is a schematic plan view schematically illustrating a display device in accordance with an embodiment.

FIG. 3 is a schematic plan view schematically illustrating a display device DD in accordance with an embodiment.

The display device DD may be formed to emit light. Referring to FIG. 3, the display device DD may include a substrate SUB, and pixels PXL disposed on the substrate SUB. Although not illustrated in the drawing, the display device DD may further include a driving circuit component (for example, a scan driver and a data driver), lines, and pads which are formed to drive the pixels PXL.

The display device DD may include a display area DA and a non-display area NDA. The non-display area NDA may refer to an area other than the display area DA. The non-display area NDA may enclose at least a portion of the display area DA.

The substrate SUB may form a base of the display device DD. The substrate SUB may be a rigid or flexible substrate or film but is not limited to a specific example.

The display area DA may refer to an area in which the pixels PXL are disposed. The non-display area NDA may refer to an area in which the pixels PXL are not disposed. The driving circuit component, the lines, and the pads which are connected to the pixels PXL of the display area DA may be disposed in the non-display area NDA.

For example, the pixels PXL may be arranged or disposed in a stripe or PENTILE™ arrangement structure or the like, but the disclosure is not limited thereto. Various embodiments may be applied to the arrangement structure of the pixels PXL.

In an embodiment, the pixels PXL may include a first pixel PXL1, a second pixel PXL2, and a third pixel PXL3. Each of the first pixel PXL1, the second pixel PXL2, and the third pixel PXL3 may be a sub-pixel. At least one first pixel PXL1, at least one second pixel PXL2, and at least one third pixel PXL3 may form one pixel unit capable of emitting various colors of light.

For example, each of the first pixel PXL1, the second pixel PXL2, and the third pixel PXL3 may emit a color of light. For instance, the first pixel PXL1 may be a red pixel formed to emit red (for example, first color) light, the second pixel PXL2 may be a green pixel formed to emit green (for example, second color) light, and the third pixel PXL3 may be a blue pixel formed to emit red (for example, third color) light. However, the color, type, and/or number of the first pixel PXL1, the second pixel PXL2, and the third pixel PXL3 which form each pixel unit is not limited to a specific example.

Figure 4:
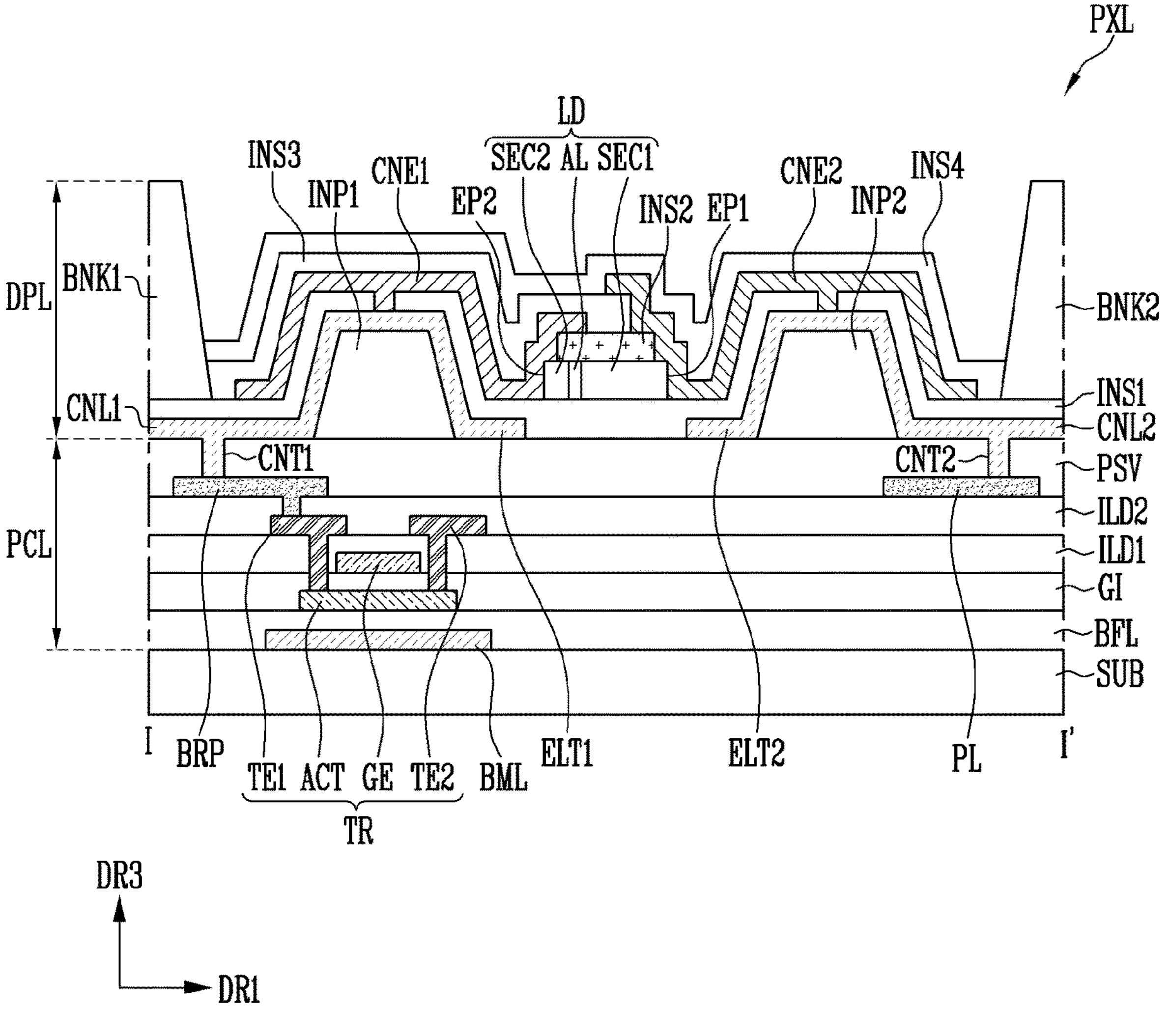
FIG. 4 is a schematic sectional view illustrating a pixel in accordance with an embodiment.

FIG. 4 is a sectional view illustrating a pixel in accordance with an embodiment.

Referring to FIG. 4, the pixel PXL may include a substrate SUB, a pixel circuit layer PCL, and a display element layer DPL.

The substrate SUB may form a base of the display device DD. The substrate SUB may be a rigid or flexible substrate or film but is not limited to a specific example. The substrate SUB may be provided as a base surface. The pixel circuit layer PCL and the display element layer DPL may be disposed on the substrate SUB.

The pixel circuit layer PCL may be disposed on the substrate SUB. The pixel circuit layer PCL may include a bottom electrode layer BML, a buffer layer BFL, a transistor TR, a gate insulating layer GI, a first interlayer insulating layer ILD1, a second interlayer insulating layer ILD2, a bridge pattern BRP, a power line PL, a passivation layer PSV, a first contactor CNT1, and a second contactor CNT2.

The bottom electrode layer BML may be disposed on the substrate SUB, and may be covered with the buffer layer BF. A portion of the bottom electrode layer BML may overlap the transistor TR, in a plan view.

In an embodiment, the bottom electrode layer BML may include conductive material, and may function as a path along which an electrical signal to be provided to the pixel circuit layer PCL and the display element layer DPL moves. For example, the bottom electrode layer BML may include any one of aluminum (Al), copper (Cu), titanium (Ti), and molybdenum (Mo).

The buffer layer BFL may be disposed on the substrate SUB. The buffer layer BFL may prevent impurities from diffusing from the outside. The buffer layer BFL may include at least one of silicon nitride ($SiN_x$), silicon oxide ($SiO_x$), silicon oxynitride ($SiO_xN_y$), and metal oxide such as aluminum oxide ($AlO_x$).

The transistor TR may be a thin film transistor. In an embodiment, the transistor TR may be a driving transistor.

The transistor TR may be electrically connected with the light emitting element LD. The transistor TR may be electrically connected to the bridge pattern BRP. However, the disclosure is not limited to the foregoing example. For example, the transistor TR may be connected to a first connection electrode CNL1 without using the bridge pattern BRP.

The transistor TR may include an active layer ACT, a first transistor electrode TE1, a second transistor electrode TE2, and a gate electrode GE.

The active layer ACT may refer to a semiconductor layer. The active layer ACT may be disposed on the buffer layer BFL. In an embodiment, the active layer ACT may include any one of polysilicon, amorphous silicon, and an oxide semiconductor.

The active layer ACT may include a first contact area which contacts the first transistor electrode TE1, and a second contact area which contacts the second transistor electrode TE2. Each of the first contact area and the second contact area may be a semiconductor pattern doped with an impurity. An area between the first contact area and the second contact area may be a channel area. The channel area may be an intrinsic semiconductor pattern which is not doped with an impurity.

The gate electrode GE may be disposed on the gate insulating layer GI. The position of the gate electrode GE may correspond to the position of the channel area of the active layer ACT. For example, the gate electrode GE may be disposed on the channel area of the active layer ACT with the gate insulating layer GI interposed therebetween. For example, the gate electrode GE may include any one of aluminum (Al), copper (Cu), titanium (Ti), and molybdenum (Mo).

The gate insulating layer GI may be disposed on the active layer ACT. The gate insulating layer GI may include inorganic material. For example, the gate insulating layer GI may include at least one of silicon nitride ($SiN_x$), silicon oxide ($SiO_x$), silicon oxynitride ($SiO_xN_y$), and aluminum oxide ($AlO_x$).

The first interlayer insulating layer ILD1 may be disposed on the gate electrode GE. The first interlayer insulating layer ILD1 may include at least one of silicon nitride ($SiN_x$), silicon oxide ($SiO_x$), silicon oxynitride ($SiO_xN_y$), and aluminum oxide ($AlO_x$), in the same manner as that of the gate insulating layer GI.

The first transistor electrode TE1 and the second transistor electrode TE2 may be disposed on the first interlayer insulating layer ILD1. The first transistor electrode TE1 may contact the first contact area of the active layer ACT through the gate insulating layer GI and the first interlayer insulating layer ILD1. The second transistor electrode TE2 may contact the second contact area of the active layer ACT through the gate insulating layer GI and the first interlayer insulating layer ILD1. For example, the first transistor electrode TE1 may be a drain electrode, and the second transistor electrode TE2 may be a source electrode, but the disclosure is not limited thereto.

The second interlayer insulating layer ILD2 may be disposed on the first transistor electrode TE1 and the second transistor electrode TE2. The second interlayer insulating layer ILD2 may include inorganic material in the same manner as that of the first interlayer insulating layer ILD1 and the gate insulating layer GI. The inorganic material may include at least one of materials such as silicon nitride ($SiN_x$), silicon oxide ($SiO_x$), silicon oxynitride ($SiO_xN_y$), and aluminum oxide ($AlO_x$), for example, as constituent materials of the first interlayer insulating layer ILD1 and the gate insulating layer GI.

The bridge pattern BRP may be disposed on the second interlayer insulating layer ILD2. The bridge pattern BRP may be connected to the first transistor electrode TE1 through a contact hole passing through the second interlayer insulating layer ILD2. The bridge pattern BRP may be electrically connected to the first connection electrode CNL1 through the first contactor CNT1 formed in the passivation layer PSV.

The power line PL may be disposed on the second interlayer insulating layer ILD2. The power line PL may be electrically connected to a second connection electrode CNL2 through the second contactor CNT2 formed in the passivation layer PSV. The power line PL may provide power (or a cathode signal) to the light emitting element LD through a second electrode.

The passivation layer PSV may be disposed on the second interlayer insulating layer ILD2. The passivation layer PSV may cover the bridge pattern BRP and the power line PL. The passivation layer PSV may be a via layer.

In an embodiment, the passivation layer PSV may be provided in the form of an organic insulating layer, an inorganic insulating layer, or a structure including an organic insulating layer disposed on an inorganic insulating layer, but the disclosure is not limited thereto.

In an embodiment, the first contactor CNT1 connected to one area or an area of the bridge pattern BRP and the second contactor CNT2 connected to one area or an area of the power line PL may be formed in the passivation layer PSV.

The display element layer DPL may be disposed on the pixel circuit layer PCL. The display element layer DPL may include a first insulating pattern INP1, a second insulating pattern INP2, the first connection electrode CNL1, the second connection electrode CNL2, a first electrode ELT1, a second electrode ELT2, a first insulating layer INS1, light emitting elements LD, a second insulating layer INS2, a first contact electrode CNE1, a second contact electrode CNE2, and a third insulating layer INS3.

The first insulating pattern INP1 and the second insulating pattern INP2 may be disposed on the passivation layer PSV. The first insulating pattern INP1 and the second insulating pattern INP2 may have a shape, protruding in a display direction (for example, in the third direction DR3) of the display device DD. In an embodiment, the first insulating pattern INP1 and the second insulating pattern INP2 may include organic material or inorganic material, but the disclosure is not limited thereto.

The first connection electrode CNL1 and the second connection electrode CNL2 may be disposed on the passivation layer PSV. The first connection electrode CNL1 may be connected to the first electrode ELT1. The first connection electrode CNL1 may be electrically connected to the bridge pattern BRP through the first contactor CNT1. The first connection electrode CNL1 may electrically connect the bridge pattern BRP to the first electrode ELT1. The second connection electrode CNL2 may be connected to the second electrode ELT2. The second connection electrode CNL2 may be electrically connected to the power line PL through the second contactor CNT2. The second connection electrode CNL2 may electrically connect the power line PL with the second electrode ELT2.

The first electrode ELT1 and the second electrode ELT2 may be disposed on the passivation layer PSV. In an embodiment, at least a portion of the first electrode ELT1 may be disposed on the first insulating pattern INP1, and at least a portion of the second electrode ELT2 may be disposed on the second insulating pattern INP2, so that each may function as a reflective partition wall.

The first electrode ELT1 may be electrically connected with the light emitting elements LD. The first electrode ELT1 may be electrically connected to the first contact electrode CNE1 through a contact hole formed in the first insulating layer INS1. The first electrode ELT1 may provide an anode signal to the light emitting elements LD.

The second electrode ELT2 may be electrically connected with the light emitting elements LD. The second electrode ELT2 may be electrically connected to the second contact electrode CNE2 through a contact hole formed in the first insulating layer INS1. The second electrode ELT2 may apply a cathode signal (for example, a ground signal) to the light emitting elements LD.

The first electrode ELT1 and the second electrode ELT2 may include conductive material. For example, the first electrode EL1 and the second electrode EL2 each may include metal such as silver (Ag), magnesium (Mg), aluminum (Al), platinum (Pt), palladium (Pd), gold (Au), nickel (Ni), neodymium (Nd), iridium (Ir), chrome (Cr), titanium (Ti), or an alloy thereof. However, the disclosure is not limited to the foregoing example.

In an embodiment, the first electrode ELT1 and the second electrode ELT2 may function as alignment electrodes for the light emitting elements LD. For example, the light emitting elements LD may be arranged or disposed based on electrical signals provided from the first electrode ELT1 and the second electrode ELT2.

The first insulating layer INS1 may be disposed on the passivation layer PSV. The first insulating layer INS1 may cover the first electrode ELT1 and the second electrode ELT2. The first insulating layer INS1 may stabilize connection between the electrode components and reduce external influence. The first insulating layer INS1 may include at least one of silicon nitride ($SiN_x$), silicon oxide ($SiO_x$), silicon oxynitride ($SiO_xN_y$), and aluminum oxide ($AlO_x$).

The light emitting elements LD may be disposed on the first insulating layer INS1, and each may emit light based on electrical signals provided from the first contact electrode CNE1 and the second contact electrode CNE2.

As described with reference to FIGS. 1 and 2, the light emitting element LD may include the first end EP1 and the second end EP2.

In an embodiment, the first end EP1 of the light emitting element LD may be disposed to face the second electrode ELT2 and the second contact electrode CNE2, and the second end EP2 of the light emitting element LD may be disposed to face the first electrode ELT1 and the first contact electrode CNE1.

Hence, the first semiconductor layer SEC1 of the light emitting element LD may be adjacent to the second electrode ELT2 and the second contact electrode CNE2, and the second semiconductor layer SEC2 of the light emitting element LD may be adjacent to the first electrode ELT1 and the first contact electrode CNE1.

The second insulating layer INS2 may be disposed on the light emitting elements LD. The second insulating layer INS2 may cover the active layer 12 of each light emitting element LD. In an embodiment, the second insulating layer INS2 may include any one of organic material or inorganic material.

The first contact electrode CNE1 and the second contact electrode CNE2 may be disposed on the first insulating layer INS1. The first contact electrode CNE1 may electrically connect the first electrode ELT1 with the light emitting elements LD. The second contact electrode CNE2 may electrically connect the second electrode ELT2 with the light emitting elements LD.

In an embodiment, the first contact electrode CNE1 may provide an anode signal to the light emitting elements LD, and the second contact electrode CNE2 may provide a cathode signal to the light emitting elements LD.

The first contact electrode CNE1 and the second contact electrode CNE2 may include conductive material. For example, the first contact electrode CNE1 and the second contact electrode CNE2 may include transparent conductive material including indium tin oxide (ITO), indium zinc oxide (IZO), and indium tin zinc oxide (ITZO), but the disclosure is not limited thereto.

The third insulating layer INS3 may be disposed on the first contact electrode CNE1. The third insulating layer INS3 may include any one of materials described by way of example with reference to the first insulating layer INS1. In an embodiment, a portion of the third insulating layer INS3 may be disposed between the first contact electrode CNE1 and the second contact electrode CNE2, so that the first contact electrode CNE1 and the second contact electrode CNE2 may be prevented from short-circuiting each other.

A fourth insulating layer INS4 may be disposed on the first contact electrode CNE1, the second contact electrode CNE2, and the third insulating layer INS3. The fourth insulating layer INS4 may protect the individual components of the display element layer DPL. For example, the fourth insulating layer INS4 may include at least one of silicon nitride ($SiN_x$), silicon oxide ($SiO_x$), silicon oxynitride ($SiO_xN_y$), and aluminum oxide ($AlO_x$).

The structure of the pixel PXL is not limited to the example described with reference to FIG. 4, and various embodiments which may be changed in structure may be implemented.

For example, an additional planarization layer may be included to offset a step difference between individual components. Furthermore, in an embodiment, a color conversion component including quantum dots designed to change the wavelength of light may be disposed on the display element layer DPL. In an embodiment, an additional color filter formed to allow light having a given wavelength to pass therethrough may be disposed.

Figure 5:
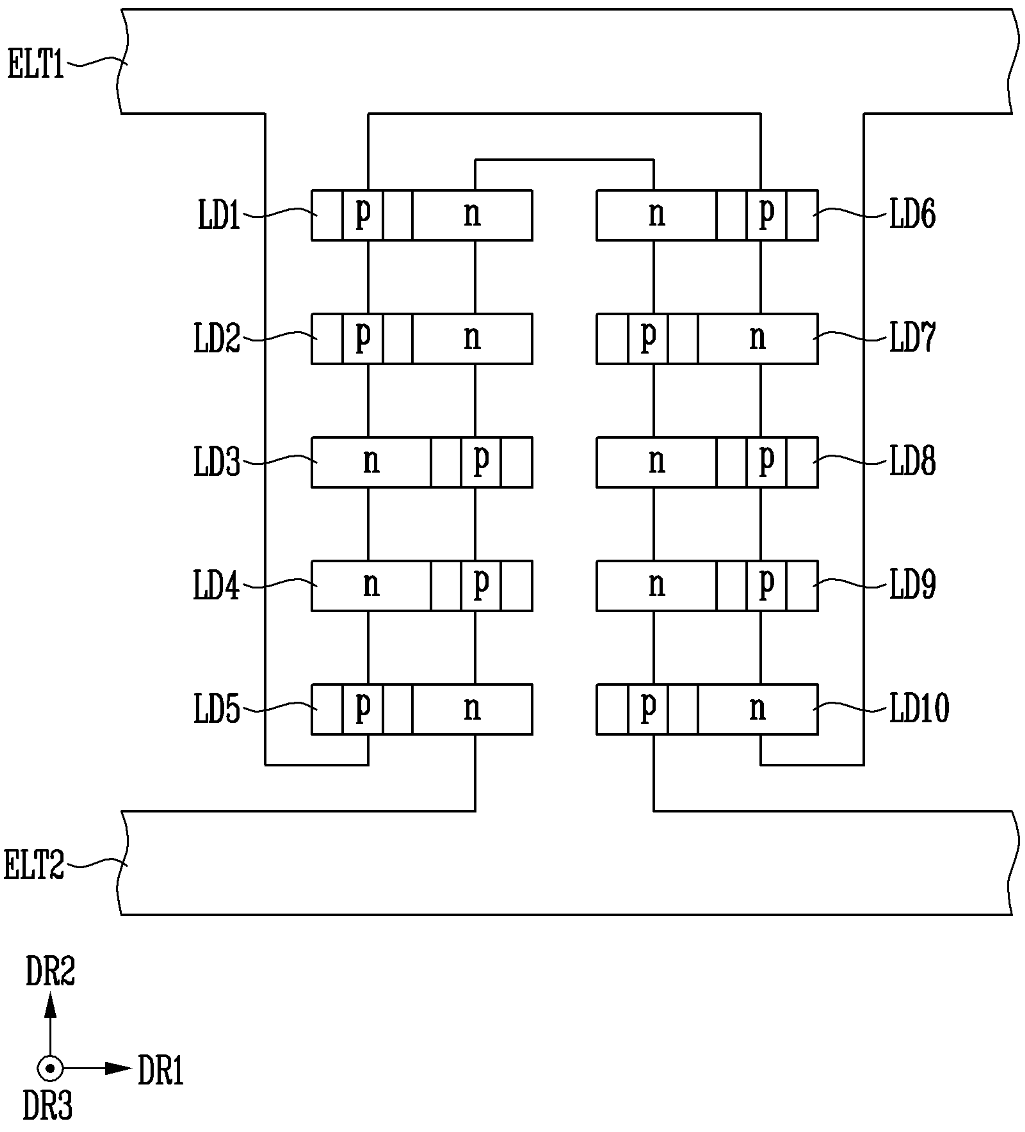
FIG. 5 is a schematic diagram for describing in detail a process of aligning light emitting elements on alignment electrodes.

FIG. 5 is a schematic diagram for describing in detail a process of aligning light emitting elements on alignment electrodes.

Referring to FIG. 5, after the first electrode ELT1 and the second electrode ETL2 are disposed on the substrate SUB, a plurality of light emitting elements LD1 to LD10 may be aligned between the first electrode ELT1 and the second electrode ELT2.

In detail, after the first electrode ELT1 and the second electrode ELT2 are disposed on the substrate SUB at positions spaced apart from each other, ink including the plurality of light emitting elements LD1 to LD10 may be provided. Subsequently, an AC voltage having preset frequency and magnitude may be applied between the first electrode ELT1 and the second electrode ELT2. In the case where an AC voltage is applied between the first electrode ELT1 and the second electrode ELT2, the polarities of the voltages of the first electrode ELT1 and the second electrode ELT2 may be changed over time. The first electrode ELT1 and the second electrode ELT2 may have polarities opposite to each other. For example, if the first electrode ELT1 is a positive electrode, the second electrode ELT2 may be a negative electrode. If the first electrode ELT1 is a negative electrode, the second electrode ELT2 may be a positive electrode. In the case where an AC voltage is applied between the first electrode ELT1 and the second electrode ELT2, an electric field may be formed between the first electrode ELT1 and the second electrode ELT2. If an electric field is formed between the first electrode ELT1 and the second electrode ELT2, the plurality of light emitting elements LD1 to LD10 may be placed between the first electrode ELT1 and the second electrode ELT2 by a dielectrophoretic force. The dielectrophoretic force may act on an induced dipole in a non-uniform electric field. Here, each of the plurality of light emitting elements LD1 to LD10 may be placed between the first electrode ELT1 and the second electrode ELT2 in a biased state in a first direction DR1 or in a direction opposite to the first direction DR1.

While the display device is driven, some of the plurality of light emitting elements LD1 to LD10 may not normally emit light. For example, as described with reference to FIG. 4, the transistor TR may be connected to the first electrode ELT1, and the power line PL may be connected to the second electrode ELT2, so that current may flow from the transistor TR to the power line PL via the light emitting element LD while the display device is driven. Here, light emitting elements aligned in a forward direction may normally emit light, but light emitting elements aligned in a reverse direction may not normally emit light. The light emitting elements that are aligned in a forward direction may be light emitting elements disposed such that p-type semiconductors are adjacent to an electrode having a relatively high potential between the first electrode ELT1 and the second electrode ELT2. The light emitting elements that are aligned in a forward direction may be light emitting elements disposed such that p-type semiconductors are adjacent to an electrode having a relatively high potential between the first electrode ELT1 and the second electrode ELT2. For example, as described with reference to FIG. 4, the transistor TR may be connected to the first electrode ELT1, and the power line PL may be connected to the second electrode ELT2, so that, in the case where current flows from the transistor TR to the power line PL via the light emitting element LD while the display device is driven, the first, second, fifth, sixth, eighth, and ninth light emitting elements LD1, LD2, LD5, LD6, LD8, and LD9 among the plurality of light emitting elements LD1 to LD10 may normally emit light, but the third, fourth, seventh, and tenth light emitting elements LD3, LD4, LD7, and LD10 may not emit light. Therefore, during a process of placing the plurality of light emitting elements LD1 to LD10 between the first electrode ELT1 and the second electrode ELT2, it may be important to align the plurality of light emitting elements LD1 to LD10 such that the plurality of light emitting elements LD1 to LD10 are biased in the same direction.

Figure 6A:
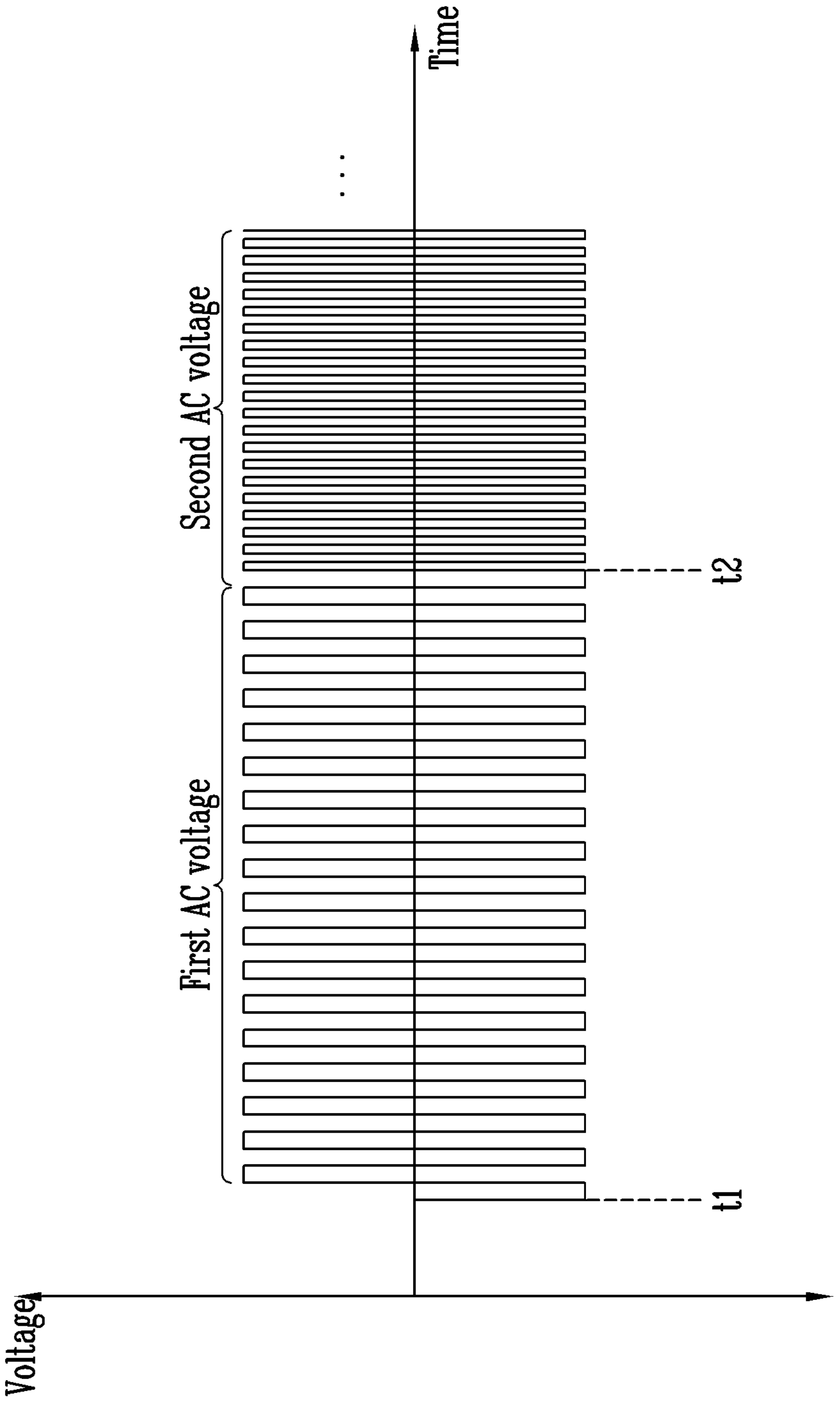
FIG. 6A is a schematic diagram for describing voltages to be applied to the alignment electrodes in accordance with an embodiment.
Figure 6B:
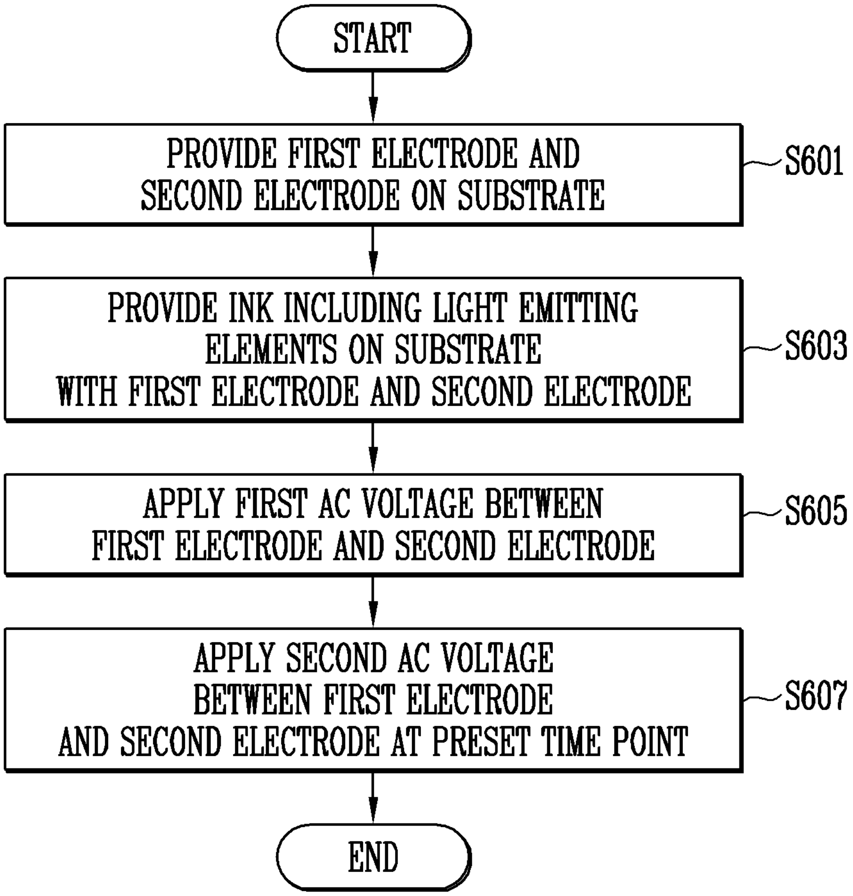
FIG. 6B is a flowchart for describing in detail a method of aligning the light emitting elements in accordance with an embodiment.

FIGS. 6A and 6B are schematic diagrams for describing in detail a process of aligning light emitting elements on the alignment electrodes in accordance with an embodiment.

In detail, FIG. 6A is a schematic diagram for describing voltages to be applied to the alignment electrode in accordance with an embodiment. FIG. 6B is a flowchart for describing in detail a method of aligning the light emitting elements in accordance with an embodiment.

Referring to FIGS. 6A and 6B, at step S601, a first electrode and a second electrode may be provided on a substrate. The substrate may be in a state after the passivation layer PSV is disposed on the second interlayer insulating layer ILD2, as described with reference to FIG. 4. After the first electrode and the second electrode are provided on the substrate, the first insulating layer INS1 may be disposed on the first electrode and the second electrode, as described with reference to FIG. 4.

As step S603, ink including a solvent and a plurality of light emitting elements may be provided on the substrate on which the first electrode and the second electrode are provided. For example, the solvent may be a liquid mixture having fluidic properties, and the plurality of light emitting elements may be provided to be dispersed in the solvent.

At step S605, a first AC voltage may be applied between the first electrode and the second electrode. For example, a ground voltage may be applied to the first electrode, and the first AC voltage may be applied to the second electrode. In an embodiment, the first AC voltage may have a preset frequency. For example, the frequency of the first AC voltage may be set to a sufficiently low frequency to prevent the light emitting elements that are present in the ink to be placed on the first electrode and the second electrode. In the case where the first AC voltage has a first frequency, the light emitting elements may float in the ink rather being placed on the first electrode and the second electrode. In an embodiment, the light emitting elements that float may be biased and aligned in the same direction.

At step S607, a second AC voltage may be applied between the first electrode and the second electrode at a preset time point. For example, a ground voltage may be applied to the first electrode, and the second AC voltage may be applied to the second electrode. In other words, referring to FIG. 6A, in a period from t1 to t2, the first AC voltage having the first frequency may be applied between the first electrode and the second electrode, and in a period after t2, the second AC voltage having a second frequency may be applied between the first electrode and the second electrode. In an embodiment, the second AC voltage may have a preset frequency. For example, the frequency of the second AC voltage may be set to a sufficiently high frequency to allow the light emitting elements that are present in the ink to be placed on the first electrode and the second electrode. In the case where the second AC voltage has the second frequency, the light emitting elements may be placed on the first electrode and the second electrode by a dielectrophoretic force. In other words, at step S605, the light emitting elements are biased and aligned in the same direction. At step S607, the light emitting elements may be placed on the first electrode and the second electrode by the dielectrophoretic force.

Although FIG. 6A illustrates that each of the first AC voltage and the second AC voltage has a square waveform, the waveform of each of the first AC voltage and the second AC voltage may be changed in various ways rather than being limited to the foregoing embodiments.

For example, each of the first AC voltage and the second AC voltage may have at least one of a square waveform, a sine waveform, a triangular waveform, and a sawtooth waveform. For example, the first AC voltage may have an asymmetrical waveform. The first AC voltage may be a voltage obtained by adding a DC offset voltage to an AC voltage having the first frequency. In the case where the first AC voltage has an asymmetrical waveform or is a voltage obtained by adding a DC offset voltage to an AC voltage, an asymmetrical electric field may be formed between the first electrode and the second electrode, so that the biasing ratio of the light emitting elements can be further enhanced.

FIGS. 7A, 7B, 7C, and 7D are schematic diagrams for describing in detail a process of aligning the light emitting elements in accordance with an embodiment.

Figure 8:
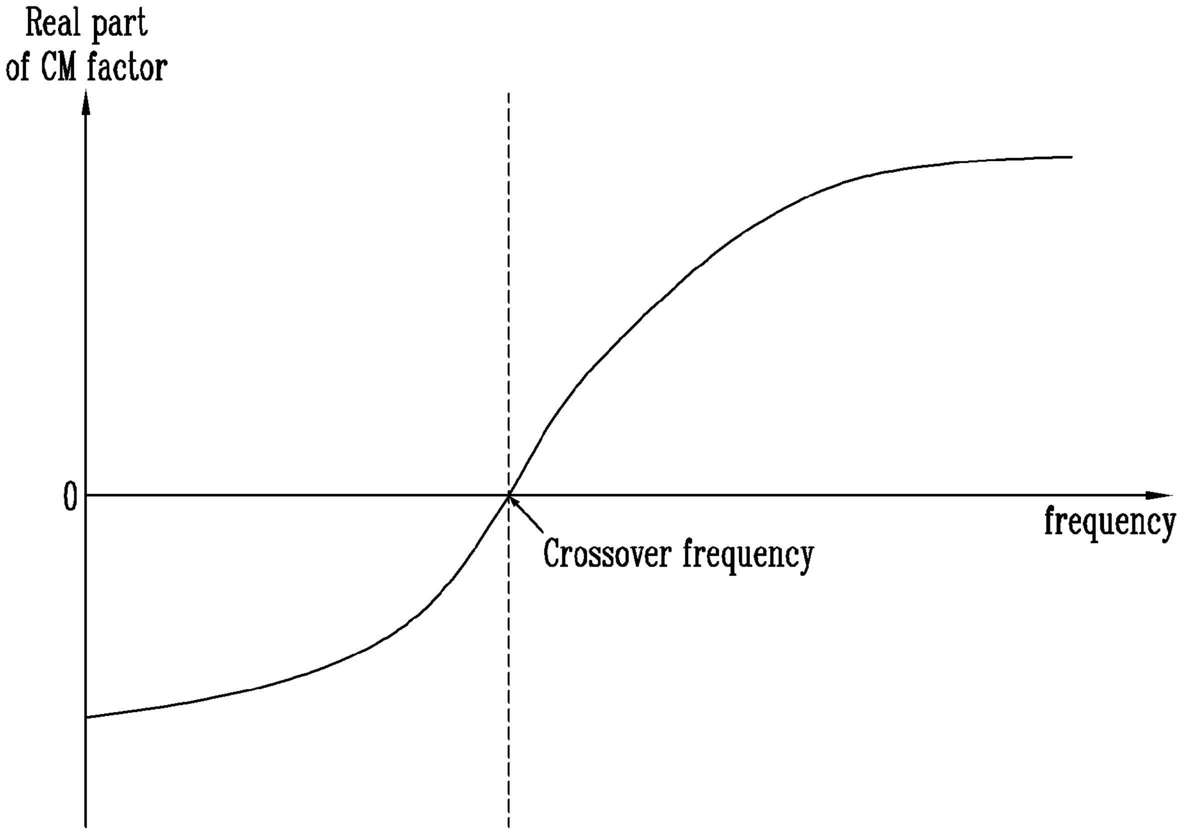
FIG. 8 is a schematic diagram for describing in detail conditions for setting a first frequency and a second frequency in accordance with an embodiment.

FIG. 8 is a schematic diagram for describing in detail conditions for setting the first frequency and the second frequency in accordance with an embodiment.

Figure 7A:
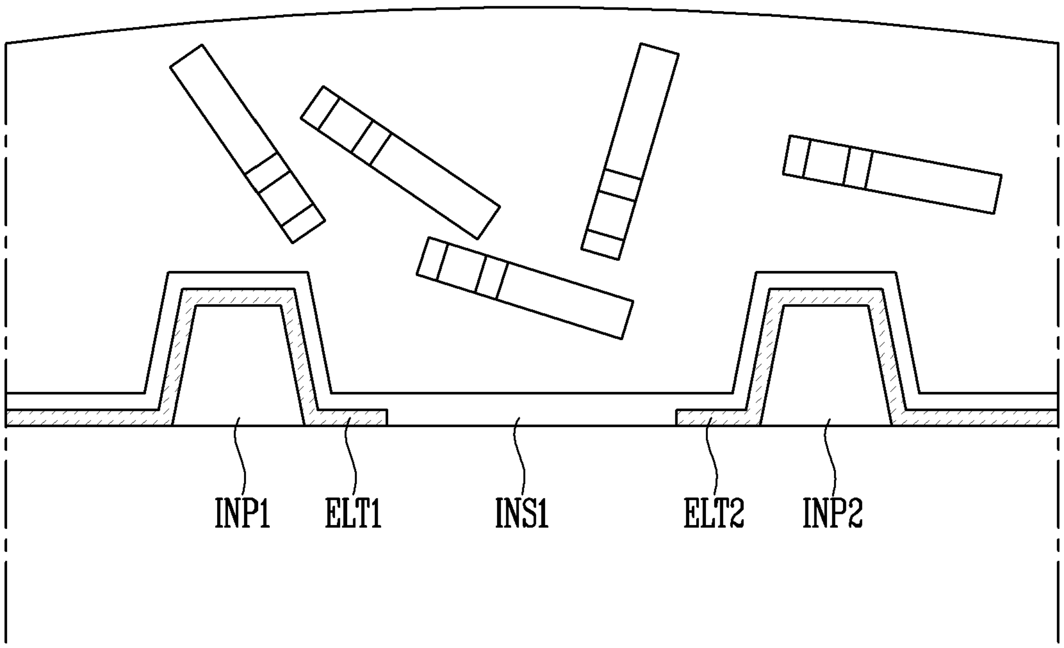
FIGS. 7A, 7B, 7C, and 7D are schematic diagrams for describing in detail a process of aligning the light emitting elements in accordance with an embodiment.

FIG. 7A illustrates the substrate that is before an AC voltage is applied between the first electrode ELT1 and the second electrode ELT2 after ink including light emitting elements is provided on the substrate on which the first electrode ELT1 and the second electrode ELT2 are formed. Referring to FIG. 7A, before an AC voltage is applied between the first electrode ELT1 and the second electrode ELT2, the light emitting elements may be present to be randomly dispersed in the ink.

Figure 7B:
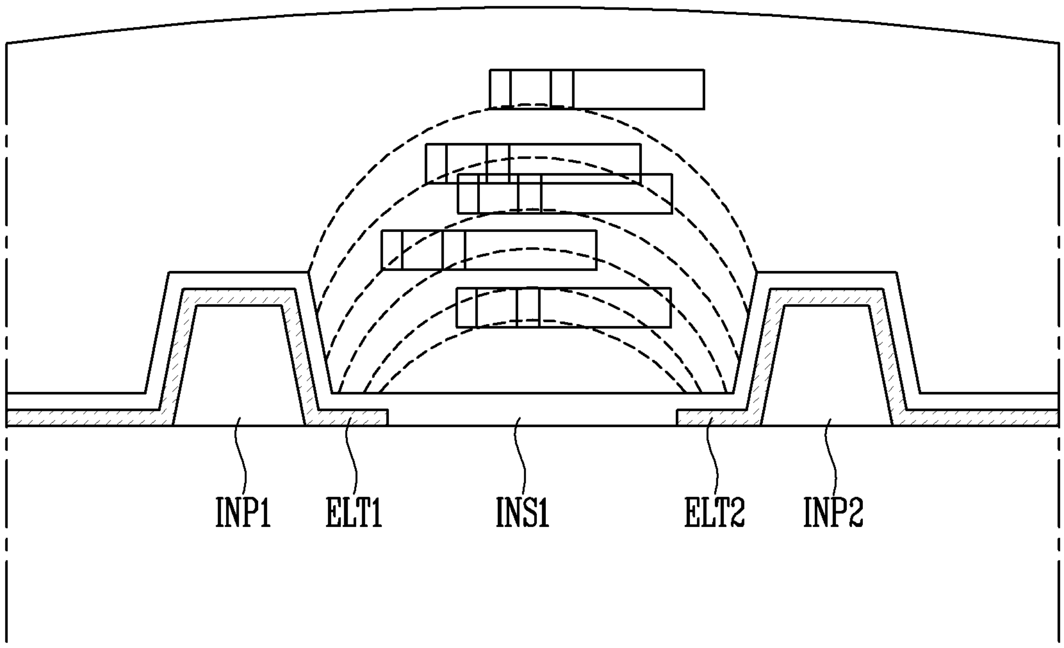

FIG. 7B illustrates the substrate that is after the first AC voltage is applied between the first electrode ELT1 and the second electrode ELT2. The first AC voltage may have a first frequency. The first frequency may be set to a sufficiently low frequency to prevent the light emitting elements from being placed on the first electrode and the second electrode. For example, the first frequency may be a frequency in case that a real part of a Clausius-Mossotti (CM) factor is less than 0 in the following equation 1.

$$f_{CM} = \frac{\varepsilon_p^* - \varepsilon_m^*}{\varepsilon_p^* + 2\varepsilon_m^*}, \quad \text{[Equation 1]}$$

Here, $f_{CM}$ may denote a CM factor, $\varepsilon^*_p$ may denote a complex dielectric constant of a light emitting element, and $\varepsilon^*_m$ may denote a complex dielectric constant of a solvent.

Furthermore, the complex dielectric constant may be represented by the following equation 2.

$$\varepsilon^* = \varepsilon - j\frac{\sigma}{\omega} \quad \text{[Equation 2]}$$

Here, $\varepsilon^*$ may denote a complex dielectric constant, $\varepsilon$ may denote a dielectric constant, $\omega$ may denote a frequency, and $\sigma$ may denote a conductivity. In an embodiment, an electric field may be generated by an AC voltage applied between the first electrode ELT1 and the second electrode ELT2. In an embodiment, frequency $\omega$ of the electric field may be determined depending on the frequency of the AC voltage applied between the first electrode ELT1 and the second electrode ELT2. For example, frequency $\omega$ of the electric field may be the same as the frequency of the AC voltage applied between the first electrode ELT1 and the second electrode ELT2.

Referring to FIG. 8, if the real part of the CM factor is 0, the frequency of the electric field may be a crossover frequency. In the case where the frequency of the electric field is lower than the crossover frequency, the dielectrophoretic force may act in a direction in which the density of the electric field is reduced. In the case where the frequency of the electric field is higher than the crossover frequency, the dielectrophoretic force may act in a direction in which the density of the electric field is increased. In FIG. 7B, the frequency of the electric field formed between the first electrode ELT1 and the second electrode eLT2 may be determined to be a frequency in case that the real part of the CM factor is lower than 0. Referring to FIG. 7B, a plurality of light emitting elements may be aligned in a floating state between the first electrode ELT1 and the second electrode ELT2. In an embodiment, the light emitting elements that float may be biased in the same direction between the first electrode ELT1 and the second electrode ELT2 by a switching force acting on an intrinsic permanent dipole. The switching force may be a force to change the biased direction of the light emitting elements to the opposite direction. In other words, in the case where an AC voltage is applied during a given time period while the light emitting elements float in the ink, the light emitting elements may act as an induced quasi-permanent dipole (IQ-PD) to be described below, and the light emitting elements may be biased in the same direction by the switching force acting on the IQ-PD.

Figure 7C:
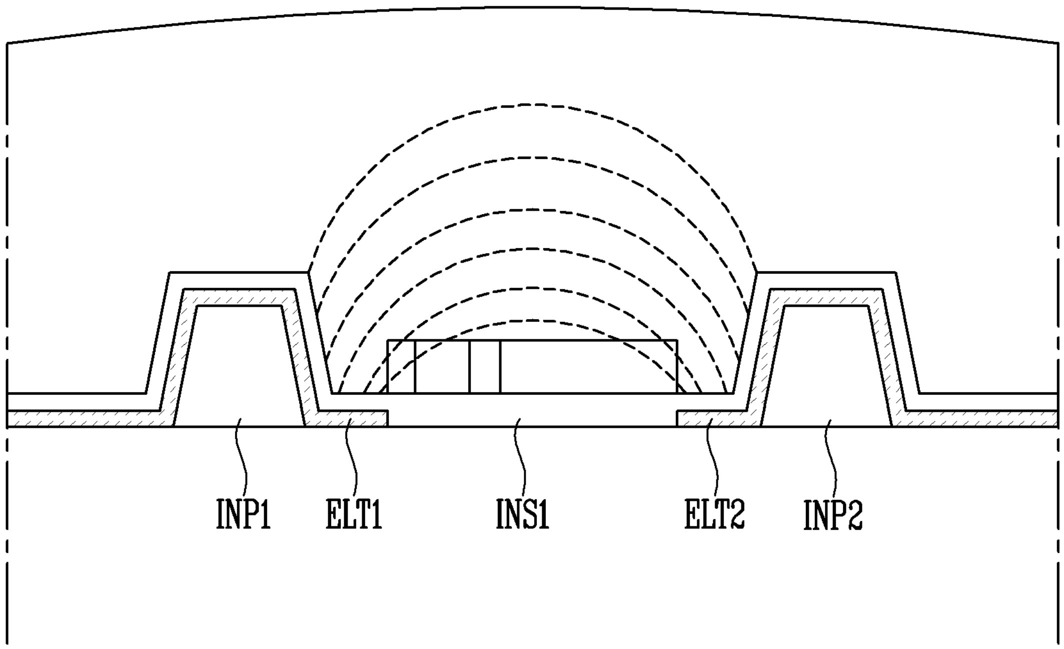

FIG. 7C illustrates the substrate that is after the second AC voltage is applied between the first electrode ELT1 and the second electrode ELT2. The second AC voltage may have a second frequency. The second frequency may be set to a sufficiently high frequency to allow the light emitting elements from being placed on the first electrode and the second electrode. For example, the second frequency may be a frequency in case that the real part of the CM factor is higher than 0 in Equation 1. The frequency of an electric field formed between the first electrode ELT1 and the second electrode ELT2 may be higher than the crossover frequency described with reference to FIG. 8. If the frequency of the electric field formed between the first electrode ELT1 and the second electrode ELT2 is higher than the crossover frequency, the dielectrophoretic force may act in a direction in which the density of the electric field is increased. Referring to FIG. 7C, the density of the electric field formed between the first electrode ELT1 and the second electrode ELT2 may be highest in an area where the first electrode ELT1 and the second electrode ELT2 are adjacent to each other. The light emitting elements may be placed between the first electrode ELT1 and the second electrode ELT2.

As described with reference to FIGS. 7A, 7B, and 7C, in an embodiment, the light emitting elements that float may be biased in the same direction and thereafter placed between the first electrode ELT1 and the second electrode ELT2. In other words, if the first AC voltage is applied between the first electrode ELT1 and the second electrode ELT2, the light emitting elements that float may be biased in the same direction. If the second AC voltage is applied between the first electrode ELT1 and the second electrode ELT2 after the light emitting elements are completely biased, the light emitting elements that are biased in the same direction may be placed between the first electrode ELT1 and the second electrode ELT2 by the dielectrophoretic force.

Figure 7D:
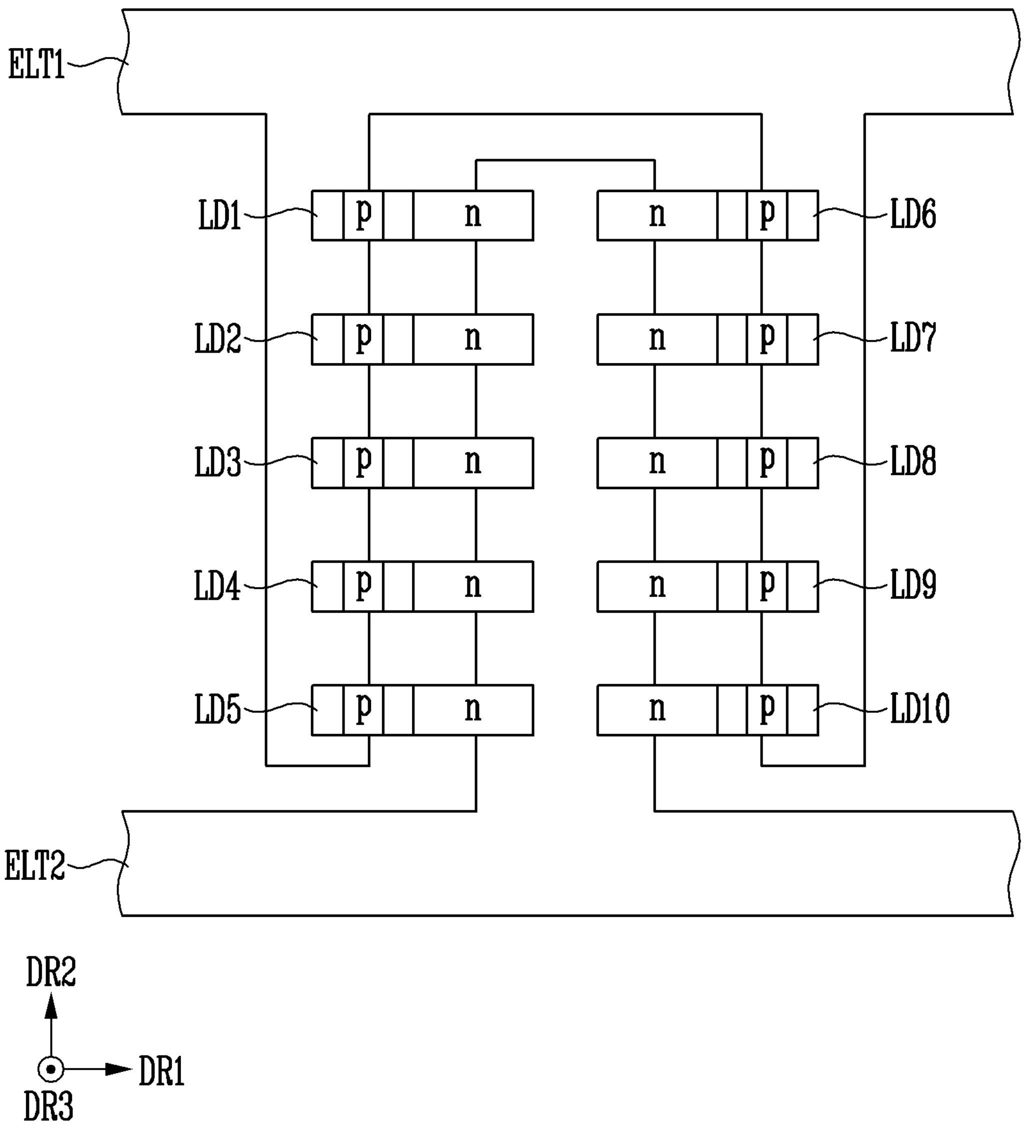

FIG. 7D illustrates the substrate that is after the process of aligning the light emitting elements between the alignment electrodes has been completed. In an embodiment, the light emitting elements LD1 to LD10 may be aligned in a forward direction and placed between the first electrode ELT1 and the second electrode ELT2. In other words, referring to FIG. 7D, the light emitting elements LD1 to LD10 may be disposed between the first electrode ELT1 and the second electrode ELT2 with the P-type semiconductors aligned to be adjacent to the first electrode ELT1. For example, as described with reference to FIG. 4, the transistor TR may be connected to the first electrode ELT1, and the power line PL may be connected to the second electrode ELT2, so that in the case where current flows from the transistor TR to the power line PL via the light emitting element LD while the display device is driven, the light emitting elements LD1 to LD10 may normally emit light because all of the light emitting elements LD1 to LD10 are aligned in the forward direction.

Figure 9A:
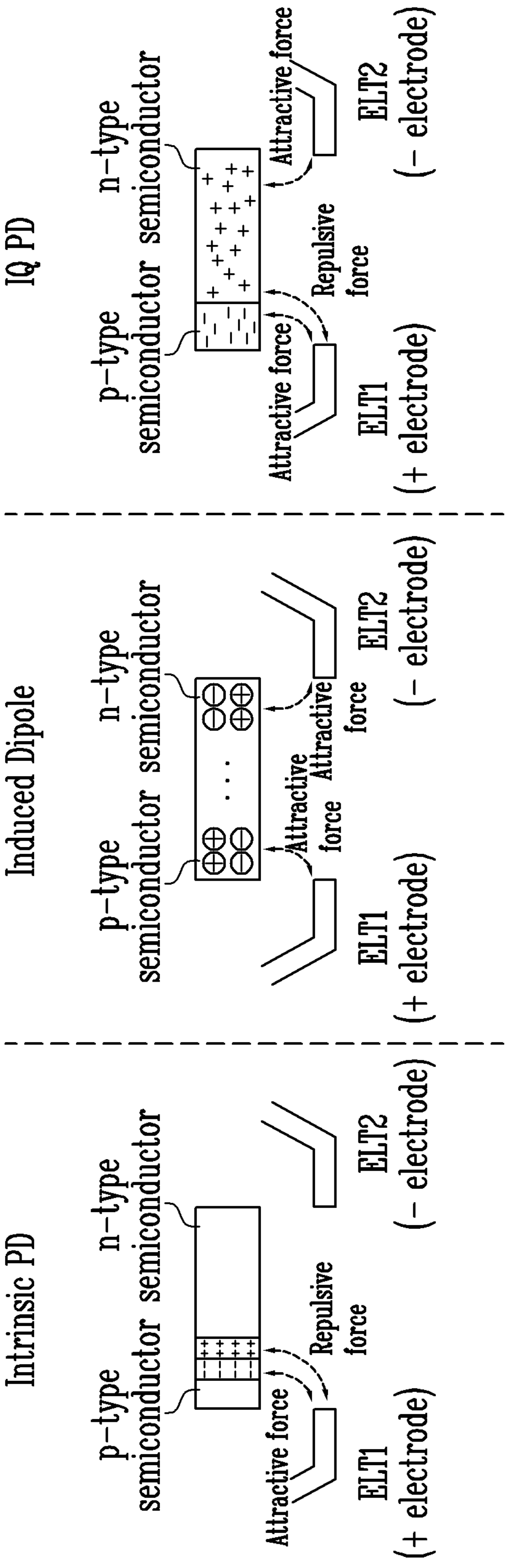
FIGS. 9A and 9B are schematic diagrams for describing the types of dipole moments generated on the light emitting elements and forces acting on the light emitting elements in response to the dipole moments, in accordance with an embodiment.
Figure 9B:
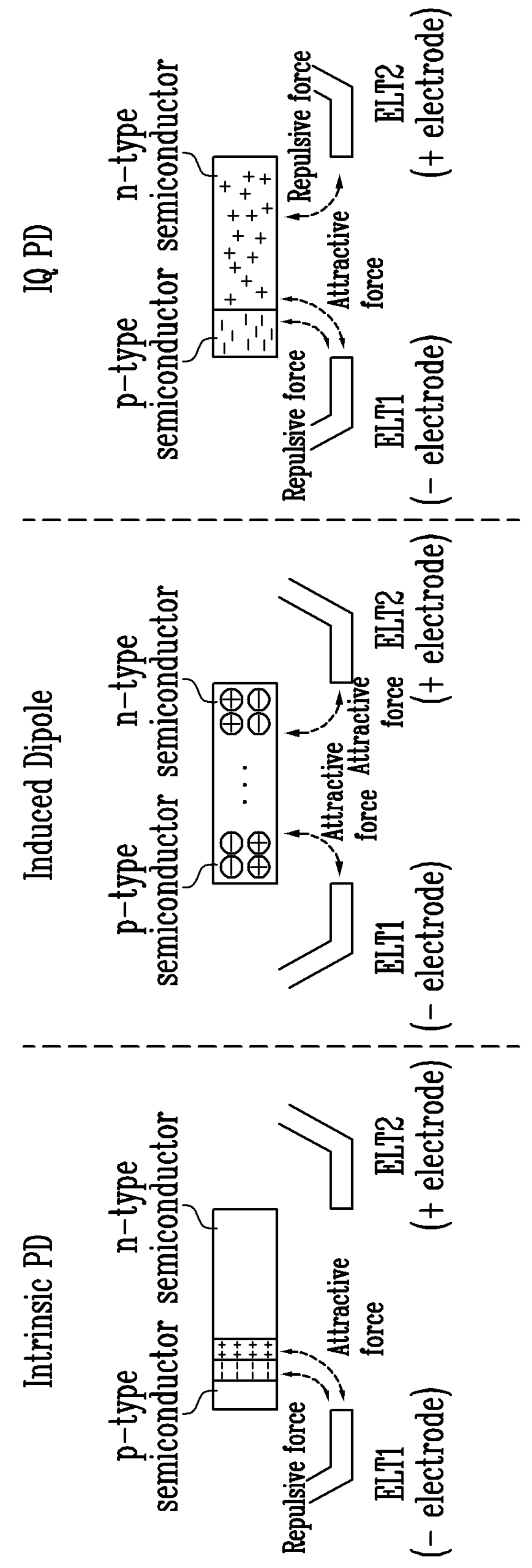

FIGS. 9A and 9B are schematic diagrams for describing the types of dipole moments generated on the light emitting elements and forces acting on the light emitting elements in response to the dipole moments, in accordance with an embodiment. In an embodiment, in the case where an AC voltage is applied between the first electrode ELT1 and the second electrode ELT2, a positive voltage and a negative voltage may be alternately applied between the first electrode ELT1 and the second electrode ELT2. In other words, a positive voltage may be applied between the first electrode ELT1 and the second electrode ELT2 during one half cycle, and a negative voltage may be applied therebetween during a following half cycle. Here, the first electrode ELT1 and the second electrode ELT2 may have polarities opposite to each other. In detail, FIG. 9A illustrates the case where the first electrode ELT1 is a positive (+) electrode and the second electrode ELT2 is a negative (−) electrode. FIG. 9B illustrates the case where the first electrode ELT1 is a negative (−) electrode and the second electrode ELT2 is a positive (+) electrode.

The light emitting elements depicted on the left, center, and right in FIGS. 9A and 9B may respectively represent an intrinsic PD, an induced dipole, and an IQ-PD.

The intrinsic PD may be generated in an area where the p-type semiconductor and the n-type semiconductor of the light emitting element are joined with each other, as holes are diffused toward the n-type semiconductor and electrons are diffused toward the p-type semiconductor. In an embodiment, the width of the p-type semiconductor of the light emitting element may be less than that of the n-type semiconductor. Therefore, in the case where the intrinsic PD is disposed as illustrated in FIGS. 9A and 9B, influence of the first electrode ELT1 that is an electrode adjacent to the area (hereinafter, referred to as a depletion area) where the p-type semiconductor and the n-type semiconductor are joined with each other, on the intrinsic PD may be greater than influence of the second electrode ELT2 on the intrinsic PD. Referring to FIG. 9A, an attractive force and a repulsive force may be simultaneously applied between the intrinsic PD and the first electrode ELT1. In detail, in the depletion area, the attractive force may act between a depletion area formed in the p-type semiconductor and the first electrode ELT1, and the repulsive force may act between a depletion area formed in the n-type semiconductor and the first electrode ELT1. Referring to FIG. 9B, an attractive force and a repulsive force may be simultaneously applied between the intrinsic PD and the first electrode ELT1. In detail, in the depletion area, the repulsive force may act between a depletion area formed in the p-type semiconductor and the first electrode ELT1, and the attractive force may act between a depletion area formed in the n-type semiconductor and the first electrode ELT1.

The induced dipole may be generated by an electric field formed around the light emitting element. In detail, referring to FIG. 9A, in the case where the first electrode ELT1 is a positive electrode and the second electrode ELT2 is a negative electrode, negative charges may be induced in an area adjacent to the first electrode ELt1 of the light emitting element, and positive charges may be induced in an area adjacent to the second electrode ELT2. Hence, an attractive force may act between the induced dipole and the first electrode ELT1 or the second electrode ELT2. Referring to FIG. 9B, in the case where the first electrode ELT1 is a negative electrode and the second electrode ELT2 is a positive electrode, positive charges may be induced in an area adjacent to the first electrode ELt1 of the light emitting element, and negative charges may be induced in an area adjacent to the second electrode ELT2. Hence, an attractive force may act between the induced dipole and the first electrode ELT1 or the second electrode ELT2. In other words, in the case where an AC voltage is applied between the first electrode ELT1 and the second electrode ELT2, the attractive force may always act on the induced dipole.

The IQ-PD may be generated by an electric field formed around the light emitting element. In the case where the electric field is formed around the light emitting element, electrons that have moved from the n-type semiconductor may be present in the p-type semiconductor, and holes that have moved from the p-type semiconductor may be present in the n-type semiconductor, so that the IQ-PD may be generated. In an embodiment, the width of the p-type semiconductor of the light emitting element may be less than that of the n-type semiconductor. Therefore, the density of electrons that are present in the p-type semiconductor may be greater than the density of holes that are present in the n-type semiconductor. In the case where the IQ-PD is disposed as illustrated in FIGS. 9A and 9B, influence of the first electrode ELT1 on the p-type semiconductor may be greater than influence of the second electrode ELT2 on the n-type semiconductor. Referring to FIG. 9A, in the case of the IQ-PD, if the first electrode ELT1 is a positive electrode and the second electrode ELT2 is a negative electrode, an attractive force may act between the p-type semiconductor and the first electrode ELT1, and an attractive force may also act between the n-type semiconductor and the second electrode ELT2. Here, the attractive force that acts between the p-type semiconductor and the first electrode ELT1 may be greater than the attractive force that acts between the n-type semiconductor and the second electrode ELT2. Referring to FIG. 9B, in the case of the IQ-PD, if the first electrode ELT1 is a negative electrode and the second electrode ELT2 is a positive electrode, a repulsive force may act between the p-type semiconductor and the first electrode ELT1, and a repulsive force may also act between the n-type semiconductor and the second electrode ELT2. Here, the repulsive force that acts between the p-type semiconductor and the first electrode ELT1 may be greater than the repulsive force that acts between the n-type semiconductor and the second electrode ELT2.

In a junction region of the light emitting element, the width of a depletion area in which the intrinsic PD is formed may be very small (approximately 0.03 μm) in general. Therefore, in FIGS. 9A and 9B, the magnitudes of the attractive force and the repulsive force that act between the intrinsic PD and the first electrode ELT1 may be very similar to each other and thus offset from each other.

Referring to FIG. 9A, in the case where the first electrode ELT1 is a positive electrode and the second electrode ELT2 is a negative electrode, an attractive force may act on the induced dipole, and an attractive force may also act on the IQ-PD (for example, an attractive force acts between the p-type semiconductor and the first electrode ELT1). Therefore, the direction in which the light emitting element is oriented may not be switched.

Referring to FIG. 9B, in the case where the first electrode ELT1 is a negative electrode and the second electrode ELT2 is a positive electrode, an attractive force may act on the induced dipole, and a repulsive force may also act on the IQ-PD (for example, a repulsive force acts between the p-type semiconductor and the first electrode ELT1). In case that the magnitude of the repulsive force that acts on the IQ-PD is greater than that of the attractive force that acts on the induced dipole, the direction in which the light emitting element is oriented may be switched.

As the distance between the induced dipole and the electrode is reduced, the magnitude of the attractive force that acts on the induced dipole may be increased. Therefore, after the light emitting element has been placed between the first electrode ELT1 and the second electrode ELT2, it may be difficult to switch the direction in which the light emitting element is oriented. As the distance between the induced dipole and the electrode is increased, the magnitude of the attractive force that acts on the induced dipole may be reduced. Therefore, in the case where the light emitting element floats, the orientation of the light emitting element may be readily switched.

As described with reference to FIGS. 7A to 7D, in accordance with an embodiment, a first AC voltage may be applied between the first electrode ELT1 and the second electrode ELT2. The light emitting elements LD1 to LD10 may float. The frequency of the first AC voltage may be determined to be a frequency in case that the real part of the CM factor is less than 0. Because the first AC voltage is applied between the first electrode ELT1 and the second electrode ELT2 for a given period of time while the light emitting elements LD1 to LD10 float, the light emitting elements LD1 to LD10 may be biased in the same direction. For example, the light emitting elements LD1 to LD10 may be biased such that the p-type semiconductors thereof are adjacent to the first electrode ELT1 and the n-type semiconductors thereof are adjacent to the second electrode ELT2.

After the light emitting elements are biased in the same direction, a second AC voltage may be applied between the first electrode ELT1 and the second electrode ELT2. The frequency of the second AC voltage may be determined to be a frequency in case that the real part of the CM factor is greater than 0. If the second AC voltage is applied between the first electrode ELT1 and the second electrode ELT2, the light emitting elements may be placed on the first electrode ELT1 and the second electrode ELT2 by dielectrophoretic force.

In accordance with an embodiment, during a process of aligning light emitting elements on alignment electrodes, a voltage having a first frequency may be applied to the alignment electrodes and, after a given period of time has passed, a voltage having a second frequency may be applied to the alignment electrodes, so that the biasing ratio of the light emitting elements may be improved.

While the spirit and scope of the disclosure are described by detailed embodiments, it should be noted that the above-described embodiments are descriptive and should not be considered limiting. It should be understood by those skilled in the art that various changes, substitutions, and alterations may be made herein without departing from the scope of the disclosure and as defined by the following claims.

The scope of the disclosure is not limited by detailed descriptions of the specification, and should be defined by the accompanying claims. Furthermore, all changes or modifications of the disclosure derived from the meanings and scope of the claims, and equivalents thereof should be construed as being included in the scope of the disclosure.

What is claimed is:

1. A method of aligning a light emitting element, comprising:

providing ink including a plurality of light emitting elements on a substrate, a first electrode and a second electrode spaced apart from the first electrode being disposed on the substrate, wherein an insulating layer is disposed on the substrate and covers each of the first electrode and the second electrode;

performing first aligning operation of the light emitting element by applying a first alternating current (AC) voltage having a first frequency between the first electrode and the second electrode such that the plurality of light emitting elements are biased and aligned in a same direction; and performing second aligning operation of the light emitting element by applying a second AC voltage having a second frequency different from the first frequency between the first electrode and the second electrode after the applying of the first AC voltage such that the plurality of light emitting elements are placed on the first electrode and the second electrode, wherein the first frequency is a frequency in case that a real part of a Clausius-Mossotti (CM) factor is less than 0, and the CM factor is defined as $$f_{CM} = \frac{\varepsilon_p^* - \varepsilon_m^*}{\varepsilon_p^* + 2\varepsilon_m^*},$$

where $\varepsilon^*_p$ denotes a complex dielectric constant of any one of the plurality of light emitting elements, and $\varepsilon^*_m$ denotes a complex dielectric constant of a solvent included in the ink, and the second frequency is a frequency in case that a real part of a Clausius-Mossotti (CM) factor is greater than 0, during the first aligning operation, the light emitting element is aligned in a floating state between the first electrode and the second electrode while maintaining a separation with respect to the insulating layer, an electric field is formed by the first AC voltage having the first frequency, wherein the electric field is formed between the first electrode and the second electrode and around the light emitting element so that the light emitting element which is in the floating state acts as an induced dipole and an induced quasi-permanent dipole, and in case that a magnitude of a repulsive force acting on the induced quasi-permanent dipole is greater than a magnitude of an attractive force acting on the induced dipole, the light emitting element which is in the floating state is biased and aligned in the same direction between the first electrode and the second electrode by a switching force acting on the induced quasi-permanent dipole, wherein the switching force changes a biased direction of the light emitting element to an opposite direction.

2. The method according to claim 1, wherein each of the plurality of light emitting elements comprises a first conductive semiconductor and a second conductive semiconductor, and the applying of the second AC voltage is performed after the plurality of light emitting elements are biased and aligned by the first AC voltage such that the first conductive semiconductor of each of the plurality of light emitting elements is oriented toward the first electrode and the second conductive semiconductor of each of the plurality of light emitting elements is oriented toward the second electrode.

3. The method according to claim 2, wherein the applying of the second AC voltage is performed before the plurality of light emitting elements are disposed on the first electrode and the second electrode.

4. The method according to claim 1, wherein the second frequency of the second AC voltage is greater than the first frequency of the first AC voltage.

5. The method according to claim 1, wherein each of the first AC voltage and the second AC voltage has an asymmetrical waveform.

6. The method according to claim 1, wherein a waveform of each of the first AC voltage and the second AC voltage includes at least one of a square waveform, and a triangular waveform.

7. The method according to claim 1, wherein the first AC voltage is a voltage obtained by adding a direct current (DC) offset voltage to a third AC voltage having the first frequency of the first AC voltage.

8. A method of fabricating a display device, comprising:

disposing a first electrode and a second electrode spaced apart from the first electrode on a substrate, wherein an insulating layer is disposed on the substrate and covers each of the first electrode and the second electrode;

providing ink including a plurality of light emitting elements on the substrate; and aligning the plurality of light emitting elements on the first electrode and the second electrode, wherein the aligning of the plurality of light emitting elements on the first electrode and the second electrode comprises:

performing first aligning operation of the light emitting element by applying a first alternating current (AC) voltage having a first frequency between the first electrode and the second electrode such that the plurality of light emitting elements are biased and aligned in a same direction; and performing second aligning operation of the light emitting element by applying a second AC voltage having a second frequency different from the first frequency between the first electrode and the second electrode after applying the first AC voltage such that the plurality of light emitting elements are placed on the first electrode and the second electrode, wherein the first frequency is a frequency in case that a real part of a Clausius-Mossotti (CM) factor is less than 0, and the CM factor is defined as $$f_{CM} = \frac{\varepsilon_p^* - \varepsilon_m^*}{\varepsilon_p^* + 2\varepsilon_m^*},$$

where $\varepsilon^*_p$ denotes a complex dielectric constant of any one of the plurality of light emitting elements, and $\varepsilon^*_m$ denotes a complex dielectric constant of a solvent included in the ink, and the second frequency is a frequency in case that a real part of a Clausius-Mossotti (CM) factor is greater than 0, during the first aligning operation, the light emitting element is aligned in a floating state between the first electrode and the second electrode, while maintaining a separation with respect to the insulating layer, an electric field is formed by the first AC voltage having the first frequency, wherein the electric field is formed between the first electrode and the second electrode and around the light emitting element so that the light emitting element which is in the floating state acts as an induced dipole and an induced quasi-permanent dipole, and in case that a magnitude of a repulsive force acting on the induced quasi-permanent dipole is greater than a magnitude of an attractive force acting on the induced dipole, the light emitting element which is in the floating state is biased and aligned in the same direction between the first electrode and the second electrode by a switching force acting on the induced quasi-permanent dipole, wherein the switching force changes a biased direction of the light emitting element to an opposite direction.

9. The method according to claim 8, wherein each of the plurality of light emitting elements comprises a first conductive semiconductor and a second conductive semiconductor, and the applying of the second AC voltage is performed after the plurality of light emitting elements are biased and aligned by the first AC voltage such that the first conductive semiconductor of each of the plurality of light emitting elements is oriented toward the first electrode and the second conductive semiconductor of each of the plurality of light emitting elements is oriented toward the second electrode.

10. The method according to claim 9, wherein the applying of the second AC voltage is performed before the plurality of light emitting elements are disposed on the first electrode and the second electrode.

11. The method according to claim 8, wherein the second frequency of the second AC voltage is greater than the first frequency of the first AC voltage.

12. The method according to claim 8, wherein each of the first AC voltage and the second AC voltage has an asymmetrical waveform.

13. The method according to claim 8, wherein a waveform of each of the first AC voltage and the second AC voltage includes at least one of a square waveform, and a triangular waveform.

14. The method according to claim 8, wherein the first AC voltage is a voltage obtained by adding a direct current (DC) offset voltage to a third AC voltage having the first frequency of the first AC voltage.

15. The method according to claim 1, wherein the first AC voltage and the second AC voltage have a same waveform.

16. The method according to claim 8, wherein the first AC voltage and the second AC voltage have a same waveform.

* * * * *